G. L. Gerard,

Bed Bottom.

No 2,677. Reissued July 9, 1867.

Witnesses;

A. J. Tebbitt

John H. Sturmay

Inventor;

George L. Gerard

BY HIS ATTORNEY

John E. Earl

N. PETERS, PHOTO-LITHOGRAPHER, WASHINGTON, D. C.

United States Patent Office.

GEORGE L. GERARD, OF NEW HAVEN, CONNECTICUT.

*Letters Patent No.* 63,153, *dated March* 26, 1867; *reissue No.* 2,677, *dated July* 9, 1867.

IMPROVED BED-BOTTOM.

The Schedule referred to in these Letters Patent and making part of the same.

TO ALL WHOM IT MAY CONCERN:

Be it known that I, GEORGE L. GERARD, of New Haven, in the county of New Haven, and State of Connecticut, have invented a new improvement in Spring Bed; and I do hereby declare the following, when taken in connection with the accompanying drawings and the letters of reference marked thereon, to be a full, clear, and exact description of the same, and which said drawings constitute part of this specification, and represent, in—

Figure 1:
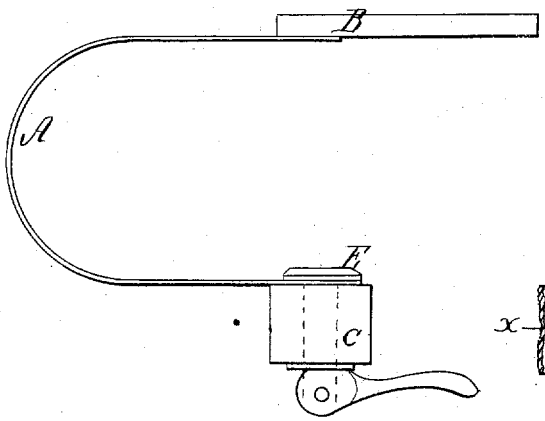

Figure 1, a side view.

Figure 2:
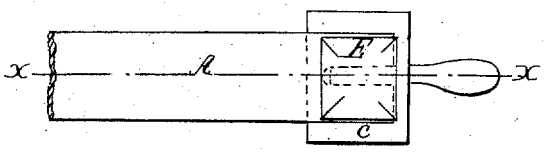

Figure 2, a top view; and in

Figure 3:
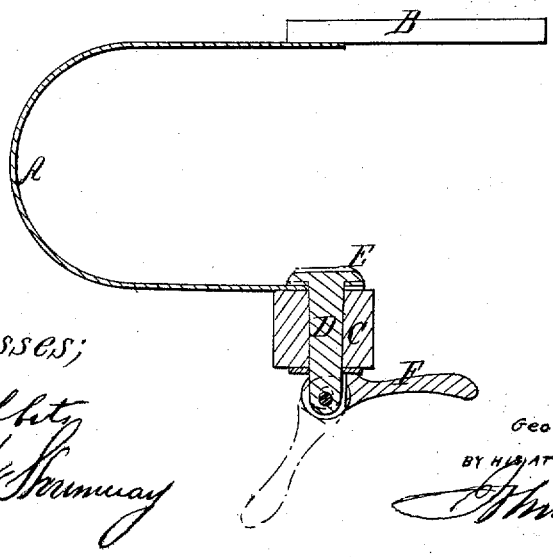

Figure 3 a section on line *x x*.

This invention relates to an improvement in the manner of securing the springs of spring-bed bottoms, and consists in the peculiar manner of attachment, whereby the spring may be readily removed and changed to any position in the bottom, or its tension adjusted.

To enable others to construct my improvement, I will proceed to a description of the same as illustrated in the accompanying drawings.

A is the spring, formed of flat or sheet steel. B, the upper slat, attached to the spring in any convenient manner, generally running longitudinally with the bed. C is a transverse bar, upon which the other or lower end of the spring rests. This lower end of the spring is slotted, as denoted by broken lines, fig. 2. D is a bolt, provided with a large head, E, nearly or quite large enough to cover the width of the spring. The said bolt passes through the bar C, and to its lower end is hinged a clamp-lever, F, which, when turned up, as denoted in fig. 3, draws the head of the bolt firmly down upon and so as to secure the spring firmly upon the bar C; and when from any cause it is desirable to remove or change the position of the spring, turn the lever down, as denoted in red, which releases the clamp from the spring and permits its removal. By this arrangement the spring, having its end slotted, may be set farther under the head, so as to shorten and consequently stiffen the spring, and thus form an adjustable spring. For similar adjustment, instead of the slot several holes may be formed in the end of the spring through which the bolt will pass. This adjustment is very important, but not so important as the ease with which the springs may be changed from one position to another; that is, one slat with its spring may be taken from one position and be changed with that of another position, so that if a spring in one position becomes partially set it may be changed to a less exposed position. It is not, therefore, positively necessary that the spring should be slotted in order to accomplish the object of my invention.

I do not wish to be understood as claiming a flat steel spring, as such are common and well known; but having thus fully described my invention, what I do claim as new and useful, and desire to secure by Letters Patent, is—

The combination of the clamp-bolt D with the spring A and the bar C, constructed so as to operate in the manner described.

GEO. L. GERARD.

Witnesses:

A. J. TIBBITS,

JOHN E. EARLE.